United States Patent
Qin et al.

(10) Patent No.: US 9,803,100 B2
(45) Date of Patent: Oct. 31, 2017

(54) NON-FLUORINATED WATER-BASED SUPERHYDROPHOBIC SURFACES

(71) Applicant: Kimberly-Clark Worldwide, Inc., Neenah, WI (US)

(72) Inventors: Jian Qin, Appleton, WI (US); Donald Eugene Waldroup, Roswell, GA (US); Constantine M. Megaridis, Oak Park, IL (US); Thomas M. Schutzius, Tinley Park, IL (US); Ilker S. Bayer, Arnesano (IT)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 563 days.

(21) Appl. No.: 13/873,614

(22) Filed: Apr. 30, 2013

(65) Prior Publication Data

US 2014/0323002 A1    Oct. 30, 2014

(51) Int. Cl.
*C09D 123/06* (2006.01)

(52) U.S. Cl.
CPC ........ *C09D 123/06* (2013.01); *C08L 2201/54* (2013.01); *Y10T 428/31938* (2015.04); *Y10T 442/2164* (2015.04)

(58) Field of Classification Search
USPC ............... 106/2, 400, 316; 252/8.62, 186.25, 252/378 R; 428/402, 489, 523; 442/79, 442/85, 327, 394, 395, 396, 397, 398, 442/399, 417; 977/753; 524/428, 584
See application file for complete search history.

(56) References Cited

U.S. PATENT DOCUMENTS

| | | |
|---|---|---|
| 3,338,992 A | 8/1967 | Kinney |
| 3,341,394 A | 9/1967 | Kinney |
| 3,494,821 A | 2/1970 | Evans |
| 3,502,763 A | 3/1970 | Hartmann |
| 3,542,615 A | 11/1970 | Dobo et al. |
| 3,574,791 A | 4/1971 | Sherman et al. |
| 3,692,618 A | 9/1972 | Dorschner et al. |
| 3,802,817 A | 4/1974 | Matsuki et al. |
| 3,849,241 A | 11/1974 | Butin et al. |
| 3,855,046 A | 12/1974 | Hansen et al. |
| 4,100,324 A | 7/1978 | Anderson et al. |
| 4,144,370 A | 3/1979 | Boulton |
| 4,340,563 A | 7/1982 | Appel et al. |
| 4,659,609 A | 4/1987 | Lamers et al. |
| 4,833,003 A | 5/1989 | Win et al. |
| 5,048,589 A | 9/1991 | Cook et al. |
| 5,108,820 A | 4/1992 | Kaneko et al. |
| 5,108,827 A | 4/1992 | Gessner |
| 5,284,703 A | 2/1994 | Everhart et al. |
| 5,294,482 A | 3/1994 | Gessner |
| 5,336,552 A | 8/1994 | Strack et al. |
| 5,350,624 A | 9/1994 | Georger et al. |
| 5,382,400 A | 1/1995 | Pike et al. |
| 5,399,412 A | 3/1995 | Sudall et al. |
| 5,468,598 A | 11/1995 | Miller et al. |
| 5,510,001 A | 4/1996 | Hermans et al. |
| 5,539,021 A | 7/1996 | Pate et al. |
| 5,591,309 A | 1/1997 | Rugowski et al. |
| 5,620,779 A | 4/1997 | Levy et al. |
| D390,708 S | 2/1998 | Brown |
| 5,759,926 A | 6/1998 | Pike et al. |
| 5,935,883 A | 8/1999 | Pike |
| 5,962,112 A | 10/1999 | Haynes et al. |
| 6,017,417 A | 1/2000 | Wendt et al. |
| D428,267 S | 7/2000 | *Romano, III et al. |
| 6,093,665 A | 7/2000 | Sayovitz et al. |
| 6,103,061 A | 8/2000 | Anderson et al. |
| 6,197,404 B1 | 3/2001 | Varona |
| 6,200,669 B1 | 3/2001 | Marmon et al. |
| 6,315,864 B2 | 11/2001 | Anderson et al. |
| 6,432,270 B1 | 8/2002 | Liu et al. |
| 7,087,662 B2 | 8/2006 | Ghosh et al. |
| 7,732,497 B2 | 6/2010 | Cumberland et al. |
| 2002/0045010 A1 | 4/2002 | Rohrbaugh et al. |
| 2004/0077770 A1 | 4/2004 | Zaghib et al. |
| 2005/0100754 A1 | 5/2005 | Moncla et al. |
| 2005/0205830 A1 | 9/2005 | Oles et al. |
| 2005/0229327 A1 | 10/2005 | Casella et al. |

(Continued)

FOREIGN PATENT DOCUMENTS

| | | |
|---|---|---|
| CN | 1830909 A | 9/2006 |
| CN | 101250597 A | 8/2008 |
| CN | 101434802 A | 5/2009 |
| CN | 101845242 A | 9/2010 |
| KR | 10-0823895 B1 | 4/2008 |
| KR | 10-2011-0059173 A | 6/2011 |
| KR | 10-2013-0029972 A | 3/2013 |
| WO | WO 99/09070 A1 | 2/1999 |
| WO | WO 2009/118552 A1 | 10/2009 |
| WO | WO 2010/002859 A2 | 1/2010 |
| WO | WO 2010/073623 A1 | 7/2010 |
| WO | WO 2011/020701 A1 | 2/2011 |

OTHER PUBLICATIONS

Co-pending U.S. Appl. No. 13/193,065, filed Jul. 28, 2011, by Qin et al. for "Superhydrophobic Surfaces."

(Continued)

*Primary Examiner* — Arti Singh-Pandey
(74) *Attorney, Agent, or Firm* — Kimberly-Clark Worldwide, Inc.

(57) ABSTRACT

A superhydrophobic surface includes a substrate treated with a non-fluorinated composition, the composition including a hydrophobic component free of fluorine; a filler particle; and water, wherein the composition is at a pH greater than 7, and wherein the hydrophobic component is in an aqueous dispersion. The superhydrophobic surface alternatively includes a substrate treated with a non-fluorinated composition, the composition including a hydrophobic polymer free of fluorine; an exfoliated graphite filler particle including acid functional groups; water; and a stabilizing compound, wherein the composition is at a pH greater than 7, and wherein the hydrophobic polymer is in an aqueous dispersion.

20 Claims, 8 Drawing Sheets

(56) References Cited

U.S. PATENT DOCUMENTS

| | | |
|---|---|---|
| 2006/0172641 A1 | 8/2006 | Hennige et al. |
| 2006/0263516 A1* | 11/2006 | Jones .................... C03C 17/007 427/180 |
| 2007/0027232 A1 | 2/2007 | Walsh et al. |
| 2007/0128142 A1 | 6/2007 | Harrison et al. |
| 2007/0135007 A1 | 6/2007 | McCarthy et al. |
| 2007/0264437 A1 | 11/2007 | Zimmermann et al. |
| 2008/0015298 A1 | 1/2008 | Xiong et al. |
| 2008/0102347 A1 | 5/2008 | Blunk |
| 2008/0153963 A1 | 6/2008 | Baran et al. |
| 2008/0221009 A1 | 9/2008 | Kanagasabapathy et al. |
| 2008/0221263 A1 | 9/2008 | Kanagasabapathy et al. |
| 2008/0245273 A1 | 10/2008 | Vyorkka et al. |
| 2008/0250978 A1 | 10/2008 | Baumgart et al. |
| 2008/0268233 A1 | 10/2008 | Lawin et al. |
| 2009/0107524 A1 | 4/2009 | Gross et al. |
| 2009/0227164 A1 | 9/2009 | Broch-Nielsen et al. |
| 2009/0298369 A1 | 12/2009 | Koene et al. |
| 2010/0068434 A1 | 3/2010 | Steele et al. |
| 2010/0069864 A1 | 3/2010 | Berland et al. |
| 2010/0092809 A1 | 4/2010 | Drzal et al. |
| 2010/0184346 A1 | 7/2010 | Qi et al. |
| 2010/0189925 A1 | 7/2010 | Li et al. |
| 2010/0266648 A1 | 10/2010 | Ranade et al. |
| 2011/0021698 A1 | 1/2011 | Vyoerykkae et al. |
| 2011/0207850 A1 | 8/2011 | Kan et al. |
| 2011/0287203 A1 | 11/2011 | Victor et al. |
| 2011/0311757 A1 | 12/2011 | Iverson et al. |
| 2014/0079932 A1* | 3/2014 | Aksay et al. ................ 428/219 |
| 2014/0323633 A1* | 10/2014 | Megaridis ............ C09D 123/06 524/428 |

OTHER PUBLICATIONS

Co-pending U.S. Appl. No. 13/193,145, filed Jul. 28, 2011, by Megaridis et al. for "Superhydrophobic Compositions."

Co-pending U.S. Appl. No. 13/873,663, filed Apr. 30, 2013, by Megaridis et al. for "Non-Fluorinated Water-Based Superhydrophobic Compositions."

Bhushan, Bharat and Eun Kyu Her, "Fabrication of Superhydrophobic Surfaces with High and Low Adhesion Inspired from Rose Petal," Langmuir, vol. 26, No. 11, 2010, pp. 8207-8217.

Schutzius, Thomas M. et al., "Water-Based, Nonfluorinated Dispersions for Environmentally Benign, Large-Area, Superhydrophobic Coatings," ACS Applied Materials & Interfaces, vol. 5, No. 24, Dec. 2, 2013, pp. 13419-13425.

American Society for Testing Materials (ASTM) Designation: F 903-10, "Standard Test Method for Resistance of Materials Used in Protective Clothing to Penetration by Liquids," pp. 1-10, published Feb. 2010.

Shunjin, Peng, "Preparation of Aqueous Fluoropolymer Latexes and Their Application as Finishing Agents with Water-and-Oil Repellency" Chinainfo, Aug. 7, 2007, pp. 42, 44, 47 and 48.

* cited by examiner

NON-FLUORINATED WATER-BASED SUPERHYDROPHOBIC SURFACES

BACKGROUND

The present disclosure relates to surfaces that exhibit superhydrophobic properties when treated with a composition including a water-based, non-organic solvent.

A superhydrophobic surface exhibits a sessile water contact angle of greater than 150°. If, additionally, the surface exhibits a water droplet roll-off (sliding) angle of less than 10°, the surface is deemed to be "self-cleaning." In nature, lotus leaves exhibit such properties (so-called lotus effect). Most man-made materials such as fabrics, nonwovens, cellulose tissues, polymer films, etc., do not have surfaces with such properties. Currently, there are generally two methods to modify a non-superhydrophobic surface to achieve the lotus effect. One method is to graft a hydrophobic monomer onto every surface of a non-superhydrophobic material. Such a method makes the material superhydrophobic throughout the thickness of the material, which might not be desired in most cases. It is also not cost effective, cannot be used for a continuous production, and can lead to undesirable environment issues.

Another approach is to coat a specially-formulated liquid dispersion onto a surface. Upon subsequent drying, a nanostructured superhydrophobic film forms. To use such an approach, the deposited film must exhibit a chemical and physical morphology characteristic of superhydrophobic surfaces. First, the formulation requires at least one low-surface energy (i.e., hydrophobic) component, and second, the treated surface has to have a rough surface texture, preferably at several length-scales: micro- and nano-roughness. Although various formulated dispersions capable of achieving a superhydrophobic surface exist, none of these dispersions are purely water-based.

Low-cost, large-area superhydrophobic coating treatments are of great value to many applications requiring a passive means for attaining efficient liquid repellency. While many applications are envisioned, only few are realizable due to either the high-cost or low-durability of such treatments. Recently, spray deposition of polymer-particle dispersions has been demonstrated as an excellent means for producing low-cost, large-area, durable, superhydrophobic composite coatings/films; however, the dispersions used for spray deposition of superhydrophobic coatings generally contain harsh or volatile solvents. Solvents are required for solution processing of polymers as well as for dispersing hydrophobic nanoparticles, thus inhibiting scalability due to the increased cost in chemical handling and safety concerns. This problem can be overcome by replacing solvents with water, but this situation is paradoxical: producing a highly water-repellent coating from an aqueous dispersion.

Also, such coatings usually contain fluoropolymers. A low-surface energy polymer (~20 mN/m) must be incorporated into the coating (a general requirement of any liquid repellent surface) which is conveniently achieved by utilizing fluoropolymers (e.g., fluoroacrylic copolymers, poly(tetrafluoroethylene), etc.). However, concerns over their bio-persistence have provided an impetus for eliminating these chemicals. The problems with the byproducts of fluoropolymer degradation, e.g. long-chain perfluorinated acids (PFAs), which have a documented ability to bioaccumulate, as well as the potential adverse effects PFA in maternal concentrations can have on human offspring, have led to a shift in the manufacture and usage of fluoropolymers. One common PFA of particular concern is perfluorooctanoic acid (PFOA). In 2006, the EPA introduced its PFOA (perfluorooctanoic acid) Stewardship Program and invited eight major fluoropolymer and telomer manufacturers to commit to eliminating precursor chemicals that can break down into PFOA; in one case, DuPont introduced so-called short-chain chemistry, whereby the length of perfluorinated chains within polymers are kept below a threshold in order to avoid degradation into PFOA. In other applications, usage of fluoropolymers in products that come in sustained contact with the human body or in disposable items intended for landfilling after consumption must be minimized.

Approaches to utilizing graphene/graphite in superhydrophobic applications are reported in the literature and a few will be briefly discussed here to demonstrate its applicability. In a recent report, a dispersion consisting of colloidal graphite and polytetrafluoroethylene was spray cast and sintered to form the basis for a conductive, thermally stable, water-repellent coating. Other approaches to utilizing graphite—or its exfoliated form, graphene—to form superhydrophobic films have included aerogels, poly(vinylidene fluoride) composites, and Nafion blends. Graphene oxide films can also be superhydrophobic when modified by octadecylamine; however, this is not suitable for many applications for the same reason organoclays are not being used. Work regarding wettability tuning for graphene films to water has been done, but it relies on chemisorption of acetone to defects in graphene reduced from graphene-oxide as its mechanism. In all of these studies, none of the systems were water-based, and many contained some type of fluoropolymer, which makes them not environmentally friendly or benign.

SUMMARY

For a multitude of safety, health, economic, and environmental issues, it is important both that the dispersion be fully aqueous-based when regarding commercial scale production, as this will decrease concerns associated with the use of organic solvents, and that the coatings eliminate fluoropolymers.

The present disclosure relates to a superhydrophobic surface including a substrate treated with a non-fluorinated composition, the composition including a hydrophobic component free of fluorine; a filler particle; and water, wherein the composition is at a pH greater than 7, and wherein the hydrophobic component is in an aqueous dispersion.

The present disclosure relates to a superhydrophobic surface including a substrate treated with a non-fluorinated composition, the composition including a hydrophobic polymer free of fluorine; an exfoliated graphite filler particle including acid functional groups; water; and a stabilizing compound, wherein the composition is at a pH greater than 7, and wherein the hydrophobic polymer is in an aqueous dispersion.

BRIEF DESCRIPTION OF THE FIGURES

The foregoing and other features and aspects of the present disclosure and the manner of attaining them will become more apparent, and the disclosure itself will be better understood by reference to the following description, appended claims and accompanying drawings, where:

Figure 1:
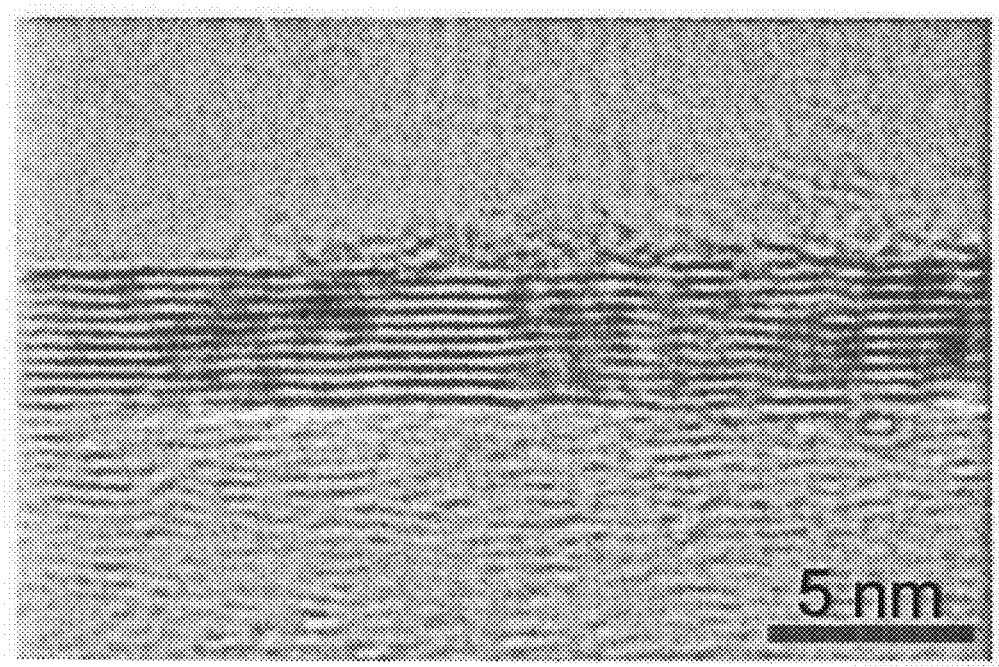
FIG. 1 illustrates high magnification TEM image of an xGnP platelet demonstrating a platelet thickness below 5 nm.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

All percentages are by weight of the total composition unless specifically stated otherwise. All ratios are weight ratios unless specifically stated otherwise.

The term "superhydrophobic" refers to the property of a surface to repel water very effectively. This property is quantified by a water contact angle exceeding 150°.

The term "hydrophobic," as used herein, refers to the property of a surface to repel water with a water contact angle from about 90° to about 120°.

The term "hydrophilic," as used herein, refers to surfaces with water contact angles well below 90°.

The term "self-cleaning," as used herein, refers to the property to repel water with the water roll-off angle on a tilting surface being below 10°.

As used herein, the term "nonwoven web" or "nonwoven fabric" means a web having a structure of individual fibers or threads that are interlaid, but not in an identifiable manner as in a knitted web. Nonwoven webs have been formed from many processes, such as, for example, meltblowing processes, spunbonding processes, air-laying processes, coforming processes and bonded carded web processes. The basis weight of nonwoven webs is usually expressed in ounces of material per square yard (osy) or grams per square meter (gsm) and the fiber diameters are usually expressed in microns, or in the case of staple fibers, denier. It is noted that to convert from osy to gsm, multiply osy by 33.91.

As used herein the term "spunbond fibers" refers to small diameter fibers of molecularly oriented polymeric material. Spunbond fibers can be formed by extruding molten thermoplastic material as fibers from a plurality of fine, usually circular capillaries of a spinneret with the diameter of the extruded fibers then being rapidly reduced as in, for example, U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having an average fiber diameter less than about 10 microns) can be achieved by various methods including, but not limited to, those described in commonly assigned U.S. Pat. No. 6,200,669 to Marmon et al. and U.S. Pat. No. 5,759,926 to Pike et al.

Meltblown nonwoven webs are prepared from meltblown fibers. As used herein the term "meltblown fibers" means fibers formed by extruding a molten thermoplastic material through a plurality of fine, usually circular, die capillaries as molten threads or filaments into converging high velocity, usually hot, gas (e.g. air) streams that attenuate the filaments of molten thermoplastic material to reduce their diameter, which can be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers are microfibers that can be continuous or discontinuous, are generally smaller than 10 microns in average diameter (using a sample size of at least 10), and are generally tacky when deposited onto a collecting surface.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "multicomponent fibers" refers to fibers or filaments that have been formed from at least two polymers extruded from separate extruders but spun together to form one fiber. Multicomponent fibers are also sometimes referred to as "conjugate" or "bicomponent" fibers or filaments. The term "bicomponent" means that there are two polymeric components making up the fibers. The polymers are usually different from each other, although conjugate fibers can be prepared from the same polymer, if the polymer in each component is different from one another in some physical property, such as, for example, melting point, glass transition temperature or the softening point. In all cases, the polymers are arranged in substantially constantly positioned distinct zones across the cross-section of the multicomponent fibers or filaments and extend continuously along the length of the multicomponent fibers or filaments. The configuration of such a multicomponent fiber can be, for example, a sheath/core arrangement, wherein one polymer is surrounded by another, a side-by-side arrangement, a pie arrangement or an "islands-in-the-sea" arrangement. Multicomponent fibers are taught in U.S. Pat. No. 5,108,820 to Kaneko et al.; U.S. Pat. No. 5,336,552 to Strack et al.; and U.S. Pat. No. 5,382,400 to Pike et al. For two component fibers or filaments, the polymers can be present in ratios of 75/25, 50/50, 25/75 or any other desired ratios.

As used herein, the term "multiconstituent fibers" refers to fibers that have been formed from at least two polymers extruded from the same extruder as a blend or mixture. Multiconstituent fibers do not have the various polymer components arranged in relatively constantly positioned distinct zones across the cross-sectional area of the fiber and the various polymers are usually not continuous along the entire length of the fiber, instead usually forming fibrils or protofibrils that start and end at random. Fibers of this general type are discussed in, for example, U.S. Pat. Nos. 5,108,827 and 5,294,482 to Gessner.

As used herein, the term "substantially continuous fibers" is intended to mean fibers that have a length that is greater than the length of staple fibers. The term is intended to include fibers that are continuous, such as spunbond fibers, and fibers that are not continuous, but have a defined length greater than about 150 millimeters.

As used herein, the term "staple fibers" means fibers that have a fiber length generally in the range of about 0.5 to about 150 millimeters. Staple fibers can be cellulosic fibers or non-cellulosic fibers. Some examples of suitable non-cellulosic fibers that can be used include, but are not limited to, polyolefin fibers, polyester fibers, nylon fibers, polyvinyl acetate fibers, and mixtures thereof. Cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers are generally composed of derivatives of cellulose formed by substitution of appropriate radicals (e.g., carboxyl, alkyl, acetate, nitrate, etc.) for hydroxyl groups along the carbon chain.

As used herein, the term "pulp" refers to fibers from natural sources such as woody and non-woody plants. Woody plants include, for example, deciduous and coniferous trees. Non-woody plants include, for example, cotton, flax, esparto grass, milkweed, straw, jute, hemp, and bagasse.

As used herein, "tissue products" are meant to include facial tissue, bath tissue, towels, hanks, napkins, and the like. The present disclosure is useful with tissue products and tissue paper in general, including but not limited to conventionally felt-pressed tissue paper, high bulk pattern densified tissue paper, and high bulk, uncompacted tissue paper.

Current formulations used to prepare a substrate to demonstrate superhydrophobicity require harmful fluorinated polymers in conjunction with solvents that include harmful volatile organic compounds (VOCs). The present disclosure solves these problems for these applications by using more preferable polymers such as polyolefins (e.g., polyethylene (PE)), and water-borne solvents to minimize the use of harmful VOCs, a common, non-trivial problem with coatings aiming to achieve superhydrophobicity upon deposition.

The present disclosure describes a water-based, non-fluorinated dispersion for the formation of superhydrophobic composite coatings from spray. Spray deposition of polymer composite coatings has been demonstrated as a low-cost, large area process for modifying the wettability (e.g., superhydrophobicity, superoleophobicity), electrical conductivity, and EMI shielding capabilities of surfaces.

A superhydrophobic surface of the present disclosure can be produced on a substrate by treating the substrate with a non-fluorinated composition including a hydrophobic component free of fluorine, a filler particle, and water. The filler particle can include one or more acid functional groups. The composition can also include a stabilizing compound. The composition is preferably at a pH greater than 7. The hydrophobic component is preferably in an aqueous dispersion. As a result, the composition can be free of volatile organic compounds (VOCs).

The hydrophobic component is a hydrophobic polymer that is dispersible in water to form the basic elements of the superhydrophobic properties of the present disclosure. The hydrophobic component can be a polymer, a nanoparticle, any other suitable material, or any combination of these. For example, the hydrophobic component can be a polyolefin. The hydrophobic component can also be a co-polymer of olefin and acrylic acid, or a mixture of a polyolefin and a co-polymer of olefin and acrylic acid.

The solid components of the present disclosure (i.e., polymer, nano-structured particles) can be present in an amount from about 1.0% to about 3.0%, by weight of the solution. Such an amount is suitable for spray applications where higher concentrations of either polymer and/or nanoparticles in the dispersion can lead to either viscoelastic behavior, resulting in either clogging of the spray nozzle or incomplete atomization and fiber formation, or dramatic increases in dispersion viscosity and thus nozzle clogging. When a different surface coating technology is used, the range might be different. For example, if a size press coating is used, use of a higher percentage of the solid components is preferred. The range can be in an amount from about 1.0% to about 10%. It should be noted that this range is not fixed and that it is a function of the materials being utilized and the procedure used to prepare the dispersion. When a higher amount of the polymer is used, the surface structure is less desirable as it lacks the proper texture to be superhydrophobic. When a lower amount of the polymer is used, the binding is less desirable as the coating behaves more so as a removable powder coating.

Additionally, it is desired that the polymer-to-particle weight ratio be about 4:1 or about 3:2, or about 1:1, or about 2:3, or about 1:4 in order to optimize the balance between low surface energy and desirable surface texture.

The composition of the present disclosure eliminates the use of an organic solvent by carefully selecting the appropriate combination of elements to impart the superhydrophobic characteristics. Preferably, the non-organic solvent is water. Any type of water can be used; however, demineralized or distilled water can be opted for use during the manufacturing process for enhanced capabilities. The use of water helps to reduce the safety concerns associated with making commercial scale formulations including organic solvents. For example, due to the high volatility and flammability of most organic solvents, eliminating such use in the composition reduces production safety hazards.

Additionally, production costs can be lowered with the elimination of ventilation and fire prevention equipment necessitated by organic solvents. Raw material costs can be reduced in addition to the transportation of such materials as an added advantage to using the non-organic solvent formulation to arrive at the present disclosure.

Additionally, because water is considered a natural resource, surfaces treated with a solvent including water as its base can be considered healthier and better for the environment. The formulation used to treat the surface of the present disclosure includes greater than about 95%, greater than about 98%, or about 99% water, by weight of the dispersion composition.

The composition includes a filler particle. The choice of filler particles is quite restrictive, as the particles should possess a high-aspect ratio, re-entrant characteristics (i.e. high curvatures), low-surface energy, and still be dispersible in water.

One potential filler is fatty amine salt modified nanoclay (i.e., organoclay), that is highly hydrophobic in its native state but can be dispersible in water by reducing the pH due to its cationic surfactant functionalization. However, for the case of water-based PE dispersions with carboxylic acid functionality or anionic surfactants (emulsifiers), the dispersions are of a basic character rendering cationic surfactant modified fillers (i.e., organoclay) not feasible without further processing. On the other hand, such fillers would be feasible for cationically stabilized HIPR emulsions.

The filler particle can include an acid functional group, which can be acrylic acid, carboxylic acid, any other suitable material, or a combination of these. For example, the filler particle can be an exfoliated graphite. The exfoliated graphite can be graphene, a few layer graphene, an exfoliated graphite nanoplatelet, any other suitable material, or any combination of these. More specifically, the filler particle can be an exfoliated graphite nanoplatelet (xGnP) that includes acid functional groups at its periphery.

Exfoliated graphite (e.g., graphene, few layer graphene (FLG), or exfoliated graphite nanoplatelet (xGnP)) is useful due to its ability to form carboxylic acid groups at the periphery of its basal planes without forming oxygen groups normal to the plane (i.e., not becoming graphene/graphite oxide) by large-area processing. Maintaining limited oxygen functionality allows the filler to stay relatively hydrophobic while still being water-dispersible under proper (high) pH conditions. This is an important point, meaning that no ionic surfactant functionality is required to play the role of dispersant (when in the dispersion) or surface energy reducer (when cast in the coating), as is the case with nanoclays—potentially reducing the fabrication cost. There is also a myriad of other non-high-aspect ratio, hydrophobic fillers that benefit from a similar approach (e.g., hydrophobic fumed silica).

The composition of the present disclosure can include one or more filler particles. The composition can include from about 0.01 to about 600 parts, by weight of the hydrophobic component, for example, polyolefin and the stabilizing agent. In certain aspects, the filler loading in the composition can be from about 0.01 to about 200 parts by the weight of the hydrophobic component, for example, polyolefin, and the stabilizing agent. It is preferred that such filler material, if used, be hydrophilic. The filler material can include conventional fillers such as milled glass, calcium carbonate, aluminum trihydrate, talc, antimony trioxide, fly ash, clays (such as bentonite or kaolin clays for example), microfibrillated cellulose fiber, nanocellulose fiber, or other known fillers. Untreated clays and talc are usually hydrophilic by nature.

In some aspects of the present disclosure, the composition includes a stabilizing compound. Hydrophobic components such as polymers and nanoparticles can be stabilized in water by using chemicals that include acid functional groups (e.g., acrylic acid, carboxylic acid), and that can become ionized in water under proper pH control (pH>7). The stabilizing compound can be KOH, $NH_3$(aq), any other suitable material, or any combination of these. The use of such polymers as hydrophobic components is possible by introducing pendant carboxylic acid functional groups that can be charge stabilized by increasing the pH of the dispersing medium (water); in short, acid functional groups form negative carboxylate ions, thus creating charge repulsion and ultimately stabilization. Carboxylic acid groups also act to promote adhesion with polar surfaces.

Once spray is deposited on a substrate, the components become insoluble in water, thus promoting water repellency. Such coatings can find a wide range of applications due to their benign processing nature, as well as the wide variety of substrates on which they can be deposited.

The particular example described herein is an all-water-based, non-fluorinated superhydrophobic surface treatment from a sprayable PE-xGnP dispersion. The hydrophobic components are stabilized in water by their acid functional groups via increased pH. Such an approach to water-repellent coatings is expected to find wide application within consumer products aiming to achieve simple, low-cost, large-area, environmentally benign superhydrophobic treatments. It is emphasized that xGnP is employed due to its ability to be simply modified by carboxylic acid chemistry, but that any hydrophobic, high-aspect ratio filler with similar chemistry can also be used. As one possibility, one can modify nanoclay by an anionic surfactant and follow the same procedures listed here for processing of xGnP to achieve similar results.

The present disclosure relates to a surface of a substrate, or the substrate itself, exhibiting superhydrophobic characteristics when treated with a formulation including a hydrophobic component, a filler particle, a stabilizing compound, and water. The superhydrophobicity can be applied either over the entire surface, patterned throughout or on the substrate material, and/or directly penetrated through the z-directional thickness of the substrate material.

In some aspects of the present disclosure, the substrate that is treated is a nonwoven web. In other aspects, the substrate is a tissue product.

The substrate of the present disclosure can be treated such that it is superhydrophobic throughout the z-directional thickness of the material and is controlled in such a way that only certain areas of the material are superhydrophobic. Such treatment can be designed to control which areas of the material can be penetrated by wetness, thereby controlling where liquid can flow.

Suitable substrates of the present disclosure can include a nonwoven fabric, woven fabric, knit fabric, or laminates of these materials. The substrate can also be a tissue or towel, as described herein. Materials and processes suitable for forming such substrate are generally well known to those skilled in the art. For instance, some examples of nonwoven fabrics that can be used in the present disclosure include, but are not limited to, spunbonded webs, meltblown webs, bonded carded webs, air-laid webs, coform webs, spunlace nonwoven webs, hydraulically entangled webs, and the like. In each case, at least one of the fibers used to prepare the nonwoven fabric is a thermoplastic material containing fiber. In addition, nonwoven fabrics can be a combination of thermoplastic fibers and natural fibers, such as, for example, cellulosic fibers (softwood pulp, hardwood pulp, thermomechanical pulp, etc.). Generally, from the standpoint of cost and desired properties, the substrate of the present disclosure is a nonwoven fabric.

If desired, the nonwoven fabric can also be bonded using techniques well known in the art to improve the durability, strength, hand, aesthetics, texture, and/or other properties of the fabric. For instance, the nonwoven fabric can be thermally (e.g., pattern bonded, through-air dried), ultrasonically, adhesively and/or mechanically (e.g. needled) bonded. For instance, various pattern bonding techniques are described in U.S. Pat. No. 3,855,046 to Hansen; U.S. Pat. No. 5,620,779 to Levy, et al.; U.S. Pat. No. 5,962,112 to Haynes, et al.; U.S. Pat. No. 6,093,665 to Sayovitz, et al.; U.S. Design Pat. No. 428,267 to Romano, et al.; and U.S. Design Pat. No. 390,708 to Brown.

The nonwoven fabric can be bonded by continuous seams or patterns. As additional examples, the nonwoven fabric can be bonded along the periphery of the sheet or simply across the width or cross-direction (CD) of the web adjacent the edges. Other bond techniques, such as a combination of thermal bonding and latex impregnation, can also be used. Alternatively and/or additionally, a resin, latex or adhesive can be applied to the nonwoven fabric by, for example, spraying or printing, and dried to provide the desired bonding. Still other suitable bonding techniques can be described in U.S. Pat. No. 5,284,703 to Everhart, et al., U.S. Pat. No. 6,103,061 to Anderson, et al., and U.S. Pat. No. 6,197,404 to Varona.

In another aspect, the substrate of the present disclosure is formed from a spunbonded web containing monocomponent and/or multicomponent fibers. Multicomponent fibers are fibers that have been formed from at least two polymer components. Such fibers are usually extruded from separate extruders but spun together to form one fiber. The polymers of the respective components are usually different from each other although multicomponent fibers can include separate components of similar or identical polymeric materials. The individual components are typically arranged in substantially constantly positioned distinct zones across the cross-section of the fiber and extend substantially along the entire length of the fiber. The configuration of such fibers can be, for example, a side-by-side arrangement, a pie arrangement, or any other arrangement.

When utilized, multicomponent fibers can also be splittable. In fabricating multicomponent fibers that are splittable, the individual segments that collectively form the unitary multicomponent fiber are contiguous along the longitudinal direction of the multicomponent fiber in a manner such that one or more segments form part of the outer surface of the unitary multicomponent fiber. In other words, one or more segments are exposed along the outer perimeter of the multicomponent fiber. For example, splittable multicomponent fibers and methods for making such fibers are described in U.S. Pat. No. 5,935,883 to Pike and U.S. Pat. No. 6,200,669 to Marmon, et al.

The substrate of the present disclosure can also contain a coform material. The term "coform material" generally refers to composite materials including a mixture or stabilized matrix of thermoplastic fibers and a second non-thermoplastic material. As an example, coform materials can be made by a process in which at least one meltblown die head is arranged near a chute through which other materials are added to the web while it is forming. Such other materials can include, but are not limited to, fibrous organic materials such as woody or non-woody pulp such as cotton, rayon, recycled paper, pulp fluff and also superabsorbent particles, inorganic absorbent materials, treated polymeric staple fibers and the like. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.

Additionally, the substrate can also be formed from a material that is imparted with texture on one or more surfaces. For instances, in some aspects, the substrate can be formed from a dual-textured spunbond or meltblown material, such as described in U.S. Pat. No. 4,659,609 to Lamers, et al. and U.S. Pat. No. 4,833,003 to Win, et al.

In one particular aspect of the present disclosure, the substrate is formed from a hydroentangled nonwoven fabric. Hydroentangling processes and hydroentangled composite webs containing various combinations of different fibers are known in the art. A typical hydroentangling process utilizes high pressure jet streams of water to entangle fibers and/or filaments to form a highly entangled consolidated fibrous structure, e.g., a nonwoven fabric. Hydroentangled nonwoven fabrics of staple length fibers and continuous filaments are disclosed, for example, in U.S. Pat. No. 3,494,821 to Evans and U.S. Pat. No. 4,144,370 to Boulton. Hydroentangled composite nonwoven fabrics of a continuous filament nonwoven web and a pulp layer are disclosed, for example, in U.S. Pat. No. 5,284,703 to Everhart, et al. and U.S. Pat. No. 6,315,864 to Anderson, et al.

Of these nonwoven fabrics, hydroentangled nonwoven webs with staple fibers entangled with thermoplastic fibers is especially suited as the substrate. In one particular example of a hydroentangled nonwoven web, the staple fibers are hydraulically entangled with substantially continuous thermoplastic fibers. The staple can be cellulosic staple fiber, non-cellulosic stable fibers or a mixture thereof. Suitable non-cellulosic staple fibers includes thermoplastic staple fibers, such as polyolefin staple fibers, polyester staple fibers, nylon staple fibers, polyvinyl acetate staple fibers, and the like or mixtures thereof. Suitable cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers are generally composed of derivatives of cellulose formed by substitution of appropriate radicals (e.g., carboxyl, alkyl, acetate, nitrate, etc.) for hydroxyl groups along the carbon chain.

One particularly suitable hydroentangled nonwoven web is a nonwoven web composite of polypropylene spunbond fibers, which are substantially continuous fibers, having pulp fibers hydraulically entangled with the spunbond fibers. Another particularly suitable hydroentangled nonwoven web is a nonwoven web composite of polypropylene spunbond fibers having a mixture of cellulosic and non-cellulosic staple fibers hydraulically entangled with the spunbond fibers.

The substrate of the present disclosure can be prepared solely from thermoplastic fibers or can contain both thermoplastic fibers and non-thermoplastic fibers. Generally, when the substrate contains both thermoplastic fibers and non-thermoplastic fibers, the thermoplastic fibers make up from about 10% to about 90%, by weight of the substrate. In a particular aspect, the substrate contains between about 10% and about 30%, by weight, thermoplastic fibers.

Generally, a nonwoven substrate will have a basis weight in the range of about 17 gsm (grams per square meter) to about 200 gsm, more typically, between about 33 gsm to about 200 gsm. The actual basis weight can be higher than 200 gsm, but for many applications, the basis weight will be in the 33 gsm to 150 gsm range.

The thermoplastic materials or fibers, making-up at least a portion of the substrate, can essentially be any thermoplastic polymer. Suitable thermoplastic polymers include polyolefins, polyesters, polyamides, polyurethanes, polyvinylchloride, polytetrafluoroethylene, polystyrene, polyethylene terephthalate, biodegradable polymers such as polylactic acid, and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(1-butene) and poly(2-butene); polypentene, e.g., poly(1-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof. These thermoplastic polymers can be used to prepare both substantially continuous fibers and staple fibers, in accordance with the present disclosure.

In another aspect, the substrate can be a tissue product. The tissue product can be of a homogenous or multi-layered construction, and tissue products made therefrom can be of a single-ply or multi-ply construction. The tissue product desirably has a basis weight of about 10 g/m2 to about 65 g/m2, and density of about 0.6 g/cc or less. More desirably, the basis weight will be about 40 g/m2 or less and the density will be about 0.3 g/cc or less. Most desirably, the density will be about 0.04 g/cc to about 0.2 g/cc. Unless otherwise specified, all amounts and weights relative to the paper are on a dry basis. Tensile strengths in the machine direction can be in the range of from about 100 to about 5,000 grams per inch of width. Tensile strengths in the cross-machine direction are from about 50 grams to about 2,500 grams per inch of width. Absorbency is typically from about 5 grams of water per gram of fiber to about 9 grams of water per gram of fiber.

Conventionally pressed tissue products and methods for making such products are well known in the art. Tissue products are typically made by depositing a papermaking furnish on a foraminous forming wire, often referred to in the art as a Fourdrinier wire. Once the furnish is deposited on the forming wire, it is referred to as a web. The web is dewatered by pressing the web and drying at elevated temperature. The particular techniques and typical equipment for making webs according to the process just described are well known to those skilled in the art. In a typical process, a low consistency pulp furnish is provided from a pressurized headbox, which has an opening for delivering a thin deposit of pulp furnish onto the Fourdrinier wire to form a wet web. The web is then typically dewatered to a fiber consistency of from about 7% to about 25% (total web weight basis) by vacuum dewatering and further dried by pressing operations wherein the web is subjected to pressure developed by opposing mechanical members, for example, cylindrical rolls. The dewatered web is then further pressed and dried by a steam drum apparatus known in the art as a Yankee dryer. Pressure can be developed at the Yankee dryer by mechanical means such as an opposing cylindrical drum pressing against the web. Multiple Yankee dryer drums can be employed, whereby additional pressing is optionally incurred between the drums. The formed sheets are considered to be compacted because the entire web is subjected to substantial mechanical compressional forces while the fibers are moist and are then dried while in a compressed state.

One particular aspect of the present disclosure utilizes an uncreped through-air-drying technique to form the tissue product. Through-air-drying can increase the bulk and softness of the web. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Ruqowski, et al.; U.S. Pat. No. 6,017,417 to Wendt, et al., and U.S. Pat. No. 6,432,270 to Liu, et al. Uncreped through-air-drying generally involves the steps of: (1) forming a furnish of cellulosic fibers, water, and optionally, other additives; (2) depositing the furnish on a traveling foraminous belt, thereby forming a fibrous web on top of the traveling foraminous belt; (3) subjecting the fibrous web to through-air-drying to remove the water from the fibrous web; and (4) removing the dried fibrous web from the traveling foraminous belt.

Conventional scalable methods, such as spraying, can be used to apply a superhydrophobic coating on a surface. Some technical difficulties are typically encountered when spraying water-based dispersions: The first major problem is insufficient evaporation of the fluid during atomization and a high degree of wetting of the dispersion onto the coated substrate, both resulting in non-uniform coatings due to contact line pinning and the so called "coffee-stain effect" when the water eventually evaporates. The second major challenge is the relatively large surface tension of water when compared with other solvents used for spray coating. Water, due to its high surface tension, tends to form non-uniform films in spray applications, thus requiring great care to ensure that a uniform coating is attained. This is especially critical for hydrophobic substrates where the water tends to bead and roll. It was observed that the best approach for applying the aqueous dispersions of the present disclosure was to produce extremely fine droplets during atomization, and to apply only very thin coatings, so as not to saturate the substrate and re-orient hydrogen bonding within the substrate that, after drying, would cause cellulosic substrates (e.g. paper towel) to become stiff.

In another aspect, the coatings are spray cast first on a substrate, such as standard paperboard or other cellulosic substrate; multiple spray passes are used to achieve different coating thicknesses. The sprayed films are then subjected to drying in an oven at about 80° C. for about 30 min to remove all excess water. Once dried, the coatings are characterized for wettability (i.e., hydrophobic vs. hydrophilic). The substrates can be weighed on a microbalance (Sartorius® LE26P) before and after coating and drying in order to determine the minimum level of coating required to induce superhydrophobicity. This "minimum coating" does not strictly mean that the sample will resist penetration by liquids, but rather that a water droplet will bead on the surface and roll off unimpeded. Liquid repellency of substrates before and after coating can be characterized by a hydrostatic pressure setup that determines liquid penetration pressures (in cm of liquid).

Contact angle values can be obtained by a backlit optical image setup utilizing a CCD camera. For dynamic contact angle hysteresis measurements (which designate the self-cleaning property), the CCD camera can be replaced by a high-speed camera, such as a REDLAKE Motion Pro camera, to accurately capture advancing and receding contact angle values. The lower the difference between advancing and receding contact angles (i.e. contact angle hysteresis), the more self-cleaning the surface is. Liquid penetration pressure can be determined by increasing the hydrostatic column pressure until liquid penetrates the sample in accordance with ASTM F903-10. Liquid penetration can be recorded by an optical image setup utilizing a CCD camera.

Wettability of the composite coatings can be first tested on paperboard, an untextured hydrophilic cellulosic substrate deemed to be representative of the general class of cellulosic substrates (textured or untextured). It is known that super-hydrophobicity and self-cleaning behavior are controlled by two mechanisms, namely, surface roughness and surface energy. It has also been shown that hierarchical structures in conjunction with low-surface energy groups offer an excellent pathway for achieving the roughness necessary for superhydrophobicity.

EXAMPLES

The following are provided for exemplary purposes to facilitate understanding of the disclosure and should not be construed to limit the disclosure to the examples.

Materials

Exfoliated graphite nanoplatelets (xGnP® Brand Nanoplatelets; Grade C 300) were obtained from XG Sciences (average particle thickness ~2 nm, average particle diameter <2 µm, surface area 300 m2 g−1). A PE dispersion in water (50 wt. %) was obtained from Dow Chemical. Ammonium hydroxide (29%) was obtained from Fisher Scientific, and formic acid (97%) was obtained from Alfa-Aesar.

Procedure

A general procedure for generation of the dispersion began by first combining the ammonium hydroxide and xGnP in a 20 mL vial (refer to Table 1 for specific concentrations). The mixture was placed in a sonication bath (output power 70 W; frequency 42 kHz; Cole-Parmer, Model#08895-04) for several minutes until a paste was formed. Next, water was added to the mixture and probe sonication (750 W, 13 mm probe dia., 20% amplitude, 20 kHz frequency, Sonics & Materials, Inc.) was performed for several minutes. Once stabilized, the PE dispersion (50 wt. % in water) was added to the xGnP-NH3(aq)-H2O mixture and was bath sonicated for 60 minutes or until stable. It should be noted that a higher quality dispersion can be achieved by adding the PE dispersion to the xGnP-NH3(aq)-H2O suspension while it is under intense mechanical mixing from a stir bar (>1200 RPM; STABLETEMP Ceramic Hot Plate). In this approach, for a 20 mL vial, it is important to keep the mass of the dispersion ~10 g so as to maximize the intensity of mixing. Once a stable dispersion is produced, it is spray deposited (Paasche VLS, siphon feed, 0.73 mm nozzle) onto one of glass slides, paper, and aluminum foil and is dried at 80° C. in an oven for 1 hour. To form high quality coatings, it is advisable to heat the substrates while they are being coated to avoid excess water collecting on the surface—a problem not typically encountered for VOCs, such as acetone. In this application we used a heat gun (PROHEAT VARITEMP heat gun PH-1200, 1300W max) to heat the substrate.

Wettability characterization of the spray deposited coating was done by measuring advancing and receding contact angle values by the sessile drop method, whereby 5-10 µL of water was dispensed (advancing measurement) and removed (receding measurement) through a flat tipped needle. Contact angle measurements were captured with a high-speed, backlit image acquisition setup (REDLAKE MotionPro camera), and a new spot was used for individual measurements. Morphological characterization of the spray deposited coatings was done with a Hitachi S-3000N Scanning Electron Microscope (SEM) after the samples were coated with a 4 nm layer of Pt/Pd. Characterization of the particle filler xGnP was done with a JEOL JEM-3010 Transmission Electron Microscope (TEM) to determine the degree of xGnP exfoliation. According to the manufacturer, xGnP is sold in granular form and requires mechanical agitation to become exfoliated. For TEM preparation, xGnP (0.013 g) was added to formic acid (10.0 g) in a 20 mL vial. The suspension was probe sonicated (13 mm probe; 20% amplitude; 1.0 kJ energy delivered to probe), mechanically mixed at room temperature for 10 minutes, and bath sonicated for 30 minutes; the suspension was then added dropwise onto a holey carbon grid for subsequent TEM analysis. FIG. 1 presents a side-view image of the xGnP platelet demonstrating adequate exfoliation (~10 layers of graphene). The xGnP comes with a variety of oxygen-containing functional groups at the edges of the platelet as a result of the exfoliation process, according to the manufacturer, that include carboxyl, lactone, pyrone, hydroxyl, and carbonyl. The weight concentration of oxygen generally increases with the degree of platelet exfoliation. For the type of xGnP used in this study the concentration is around 2 wt. %.

Results and Discussion

Figure 2:
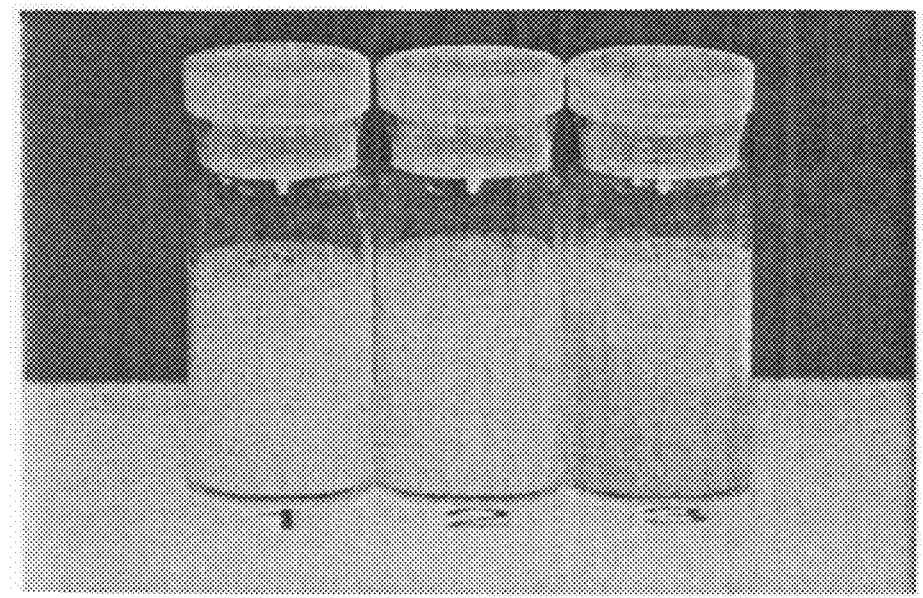
FIG. 2 illustrates 15 mL vials containing various materials as described herein.

In general, for commercial applications of paint or coating treatments, the stability of a dispersion is an extremely important property, and in the case of this study, the pH of the overall dispersion is critical. FIG. 2 presents a sequence of images with 15 mL vials all containing water and PE. The difference between the contents of the three vials is in their pH values. The dispersion in vial 1 is slightly basic, vial 2 is basic, and vial 3 is acidic; note how vial 3 is phase separated. The PE utilized in this study has acrylic acid functionality (a so-called acid functional group) that allows it to become water dispersible under basic conditions, and stay dispersed even at elevated pH values. In the case of vial 3, the addition of acetic acid no longer allows the acrylic acid groups to retain their charge, in turn phase separating the solution.

Figure 3:
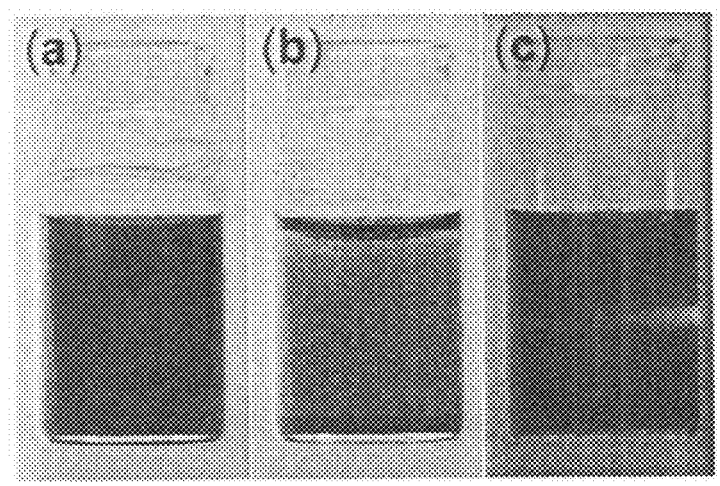
FIG. 3(a) illustrates a suspension of 0.1 wt. % xGnP in water with no electrolyte, and (b) electrolyte (0.1 wt. % NaCl). (c) Scattering effect demonstrated on a diluted (0.01 wt. %) xGnP-water suspension.
FIG. 3(b) illustrates a suspension of 0.1 wt. % xGnP in water with an electrolyte (0.1 wt. % NaCl)
FIG. 3(c) illustrates a scattering effect demonstrated on a diluted (0.01 wt. %) xGnP-water suspension.

FIG. 3(a) presents an image of a suspension formed by xGnP (hydrophobic) in water. Because these particles are inherently hydrophobic, their apparent stabilization in water without the aid of dispersants is likely due to electrostatic repulsion (i.e., ionization of acid functional groups). FIG. 3(b) presents an image of a xGnP-water suspension containing an electrolyte, where the addition of the electrolyte acts to suppress the electrical double layer over the particles and destabilize the suspension; this is a characteristic property of lyophobic colloids stabilized by electrostatic repulsion, in accordance with Derjaguin-Landau-Verwey-Overbeek (DLVO) theory. FIG. 3(c) presents an image of the suspension undergoing laser irradiation (simple laser pointer) perpendicular to the point-of-view; note the light scattering that is a characteristic trait of a fine, well-dispersed suspension supporting the colloidal nature of the xGnP-water suspension. In fine suspensions, such a scattering effect is observed for shorter wavelengths of light (i.e., blue) and is commonly referred to as the Tyndall effect, another indicator of a fine suspension, whereby longer wavelengths are scattered less strongly while passing through the suspension while shorter wavelengths of light are scattered more intensely, giving the appearance of a blue color.

Figure 4:
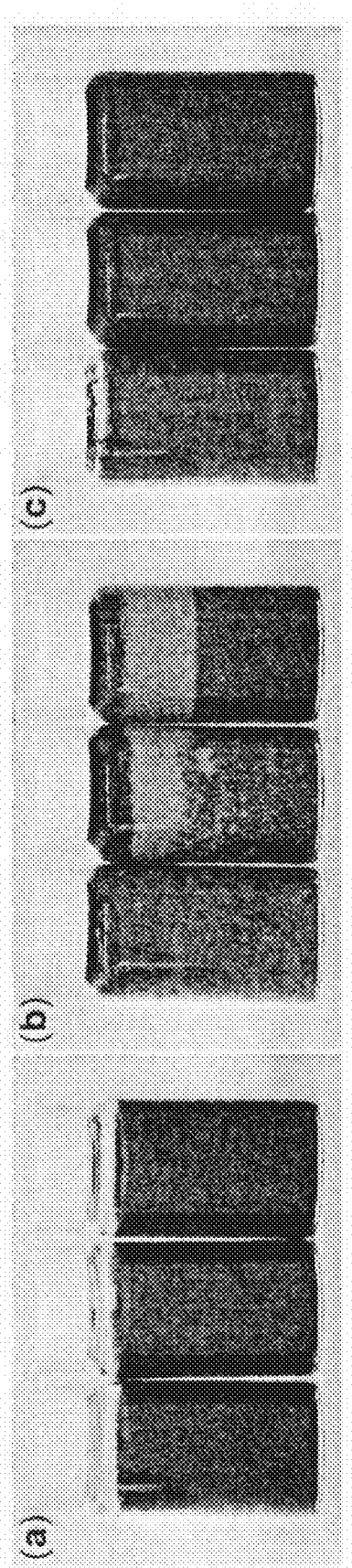
FIG. 4(a) illustrates xGnP-water suspensions in 20 mL glass vials with varying concentration of $NH_3(aq)$ (left vial 0 wt. %, middle vial 1.0 wt. %, right vial 7.7 wt. % $NH_3(aq)$)
FIG. 4(b) illustrates the vials of FIG. 4(a) with 1.0 g of a 50 wt. % PE dispersion in water added to them.
FIG. 4(c) illustrates the vials of FIG. 4(b) after 60 minutes of bath sonication.

FIG. 4 presents a sequence of images of the PE-xGnP dispersion after each major processing step (i.e., probe sonication of xGnP-water suspension, addition of PE, bath sonication of the final dispersion); ceteris paribus, the pH of the individual dispersions increases from vial-to-vial, according to their location left-to-right (i.e., the left vial has the lowest pH, the right vial has the highest pH). FIG. 4(a) presents three xGnP-water suspensions after probe sonication (first processing step). Based on visual observation, the stability of the dispersions did not appear to vary significantly from neutral to basic conditions. According to a previous report of water suspensions containing carboxylic-acid functionalized graphene, increasing the pH of the suspension only acts to increase the stability of the suspension, with the zeta potential increasing from −30 mV for pH ~6.1 to −43 mV for pH ~10. Because the xGnP-water suspension is to be stabilized by a similar mechanism, the outcome that no change in colloidal behavior is observed for increased pH, is expected. FIG. 4(b) shows the same three vials after the addition of the PE solution. In all cases, the xGnP aggregates to produce an unstable dispersion that requires the third processing step: bath sonication. The dispersions (in vials) after that final processing step are depicted in FIG. 4(c); the left vial (dispersion pH ~7) is unstable, while the middle and right vials (pH>7) are stable. It appears that in the case of vial 1, the xGnP undergoes irreversible aggregation due to the addition of PE. Aggregation of exfoliated graphite in water is a frequent problem encountered when reducing graphene oxide to graphene in water with hydrazine, due to the hydrophobicity of graphene. This problem can be addressed by controlling the pH of the suspension to use non-reactive edge functional groups (e.g., carboxylic acid) to charge stabilize the suspensions. The energy required to exfoliate, or in this case to re-disperse, graphite can become quite high owing to the extremely large surface area required to separate as well as the strong Van der Waals interactions between adjacent platelets. Regarding the stability of xGnP in aqueous solutions, previous work (described above) has shown that aqueous suspensions of graphene oxide and chemically-converted graphene have zeta potentials <−mV (stable) for pH values ranging from 7 to 11. Decreasing pH results in a lower magnitude of zeta potential and hence the dispersion is less stable. We hypothesize that the increased pH allows for charging of edge functional groups on xGnP (higher magnitude of zeta potential) and enables it to be re-dispersed much easier than for neutral conditions (pH=7).

Figure 5A:
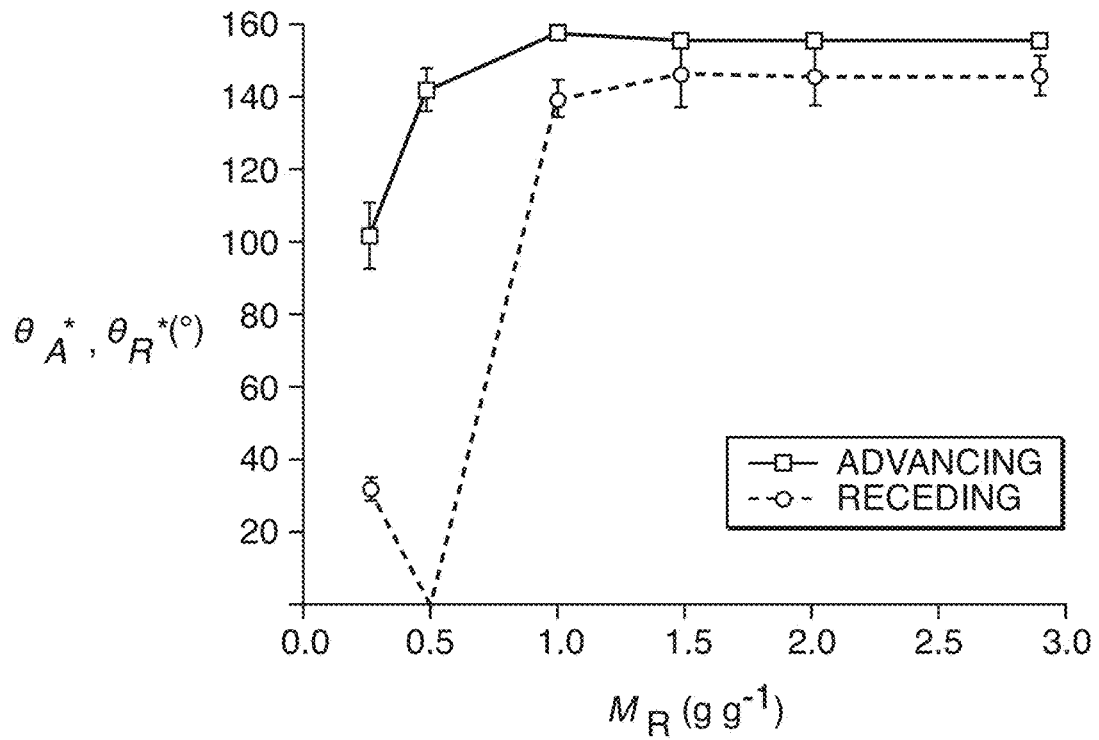
FIG. 5(a) illustrates $\theta^*_A$ and $\theta^*_R$ vs. $M_R$ (xGnP/PE mass ratio in the dry composite coating)
Figure 5B:
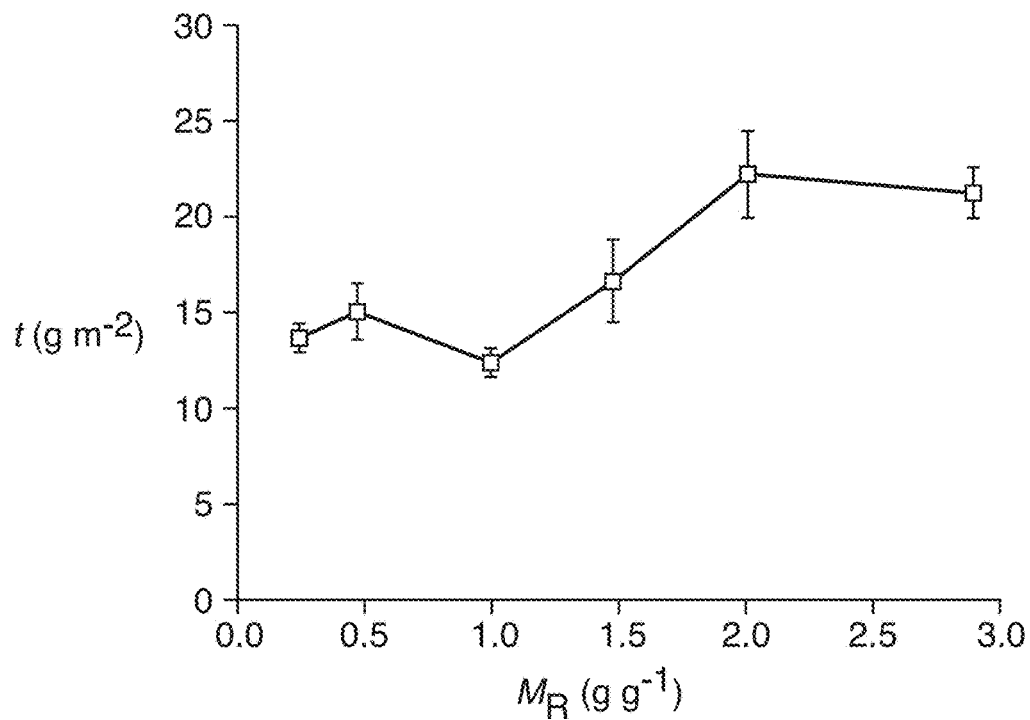
FIG. 5(b) illustrates coating add-on thickness (t) vs. $M_R$ for coatings characterized in FIG. 5(a)

FIG. 5(a) presents a plot of advancing and receding water contact angle values on spray deposited PE-xGnP coatings as a function of filler particle concentration in the dry composite coating. We define the filler particle concentration as a mass ratio, $M_R$, of the individual masses of xGnP and PE in the composite coating, respectively. As observed in previous spray coating studies, as well as the classic Johnson and Dettre experiment, initially advancing contact angle values increase while receding contact angles decrease, leading to a large contact angle hysteresis. After sufficient filler loading, the receding contact angle value abruptly jumps and becomes comparable with the advancing contact angle value (i.e., low-contact angle hysteresis), indicating water droplet mobility and ultimately liquid repellency. The wettability transition from low and high values to high and low values is commonly referred to as the Wenzel-to-Cassie Baxter transition, and is usually associated with an increase in liquid droplet mobility. As is widely reported in other spray coating literature, coating morphology as a result of spray processing and filler inclusion can, under proper circumstances, produce highly textured surfaces. When coupled with low-surface energy polymers, such coatings are capable of becoming superhydrophobic, and in some cases superoleophobic. FIG. 5(b) shows the individual add-on levels of coating to achieve the desired wetting properties presented in FIG. 5(a). All of the coating add-on levels are in the range of 10-25 g m−2, which is a typical level required to achieve superhydrophobicity from spray coating when coating untextured substrates.

Figure 6:
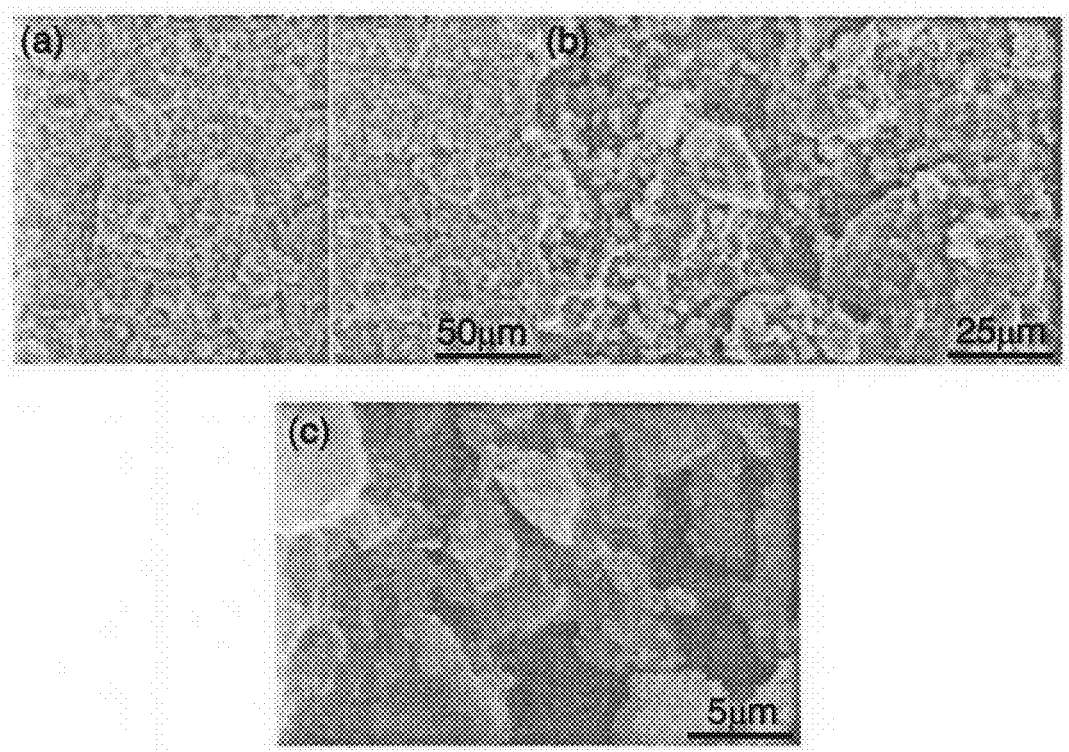
FIG. 6(a) illustrates an SEM image of the spray deposited coating ($M_R$=1.0) at low magnification.
FIG. 6(b) illustrates an SEM image of the spray deposited coating ($M_R$=1.0) at medium magnification.
FIG. 6(c) illustrates an SEM image of the spray deposited coating ($M_R$=1.0) at high magnification.

FIG. 6 presents a sequence of SEM micrographs (increasing magnification a-to-c) of a superhydrophobic coating demonstrating its high surface texture. While it is highly textured, it also has certain roughness features that contribute better to liquid repellency than others would (e.g., hierarchical, re-entrant, porous).

Figure 7:
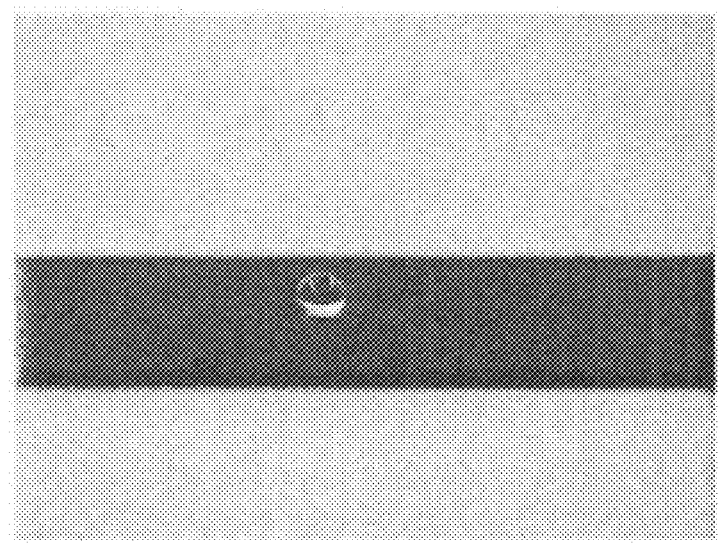
FIG. 7 illustrates a superhydrophobic PE-xGnP composite ($M_R$=0.7) formed by spray with a ~10 µL water droplet placed on it.
Figure 8:
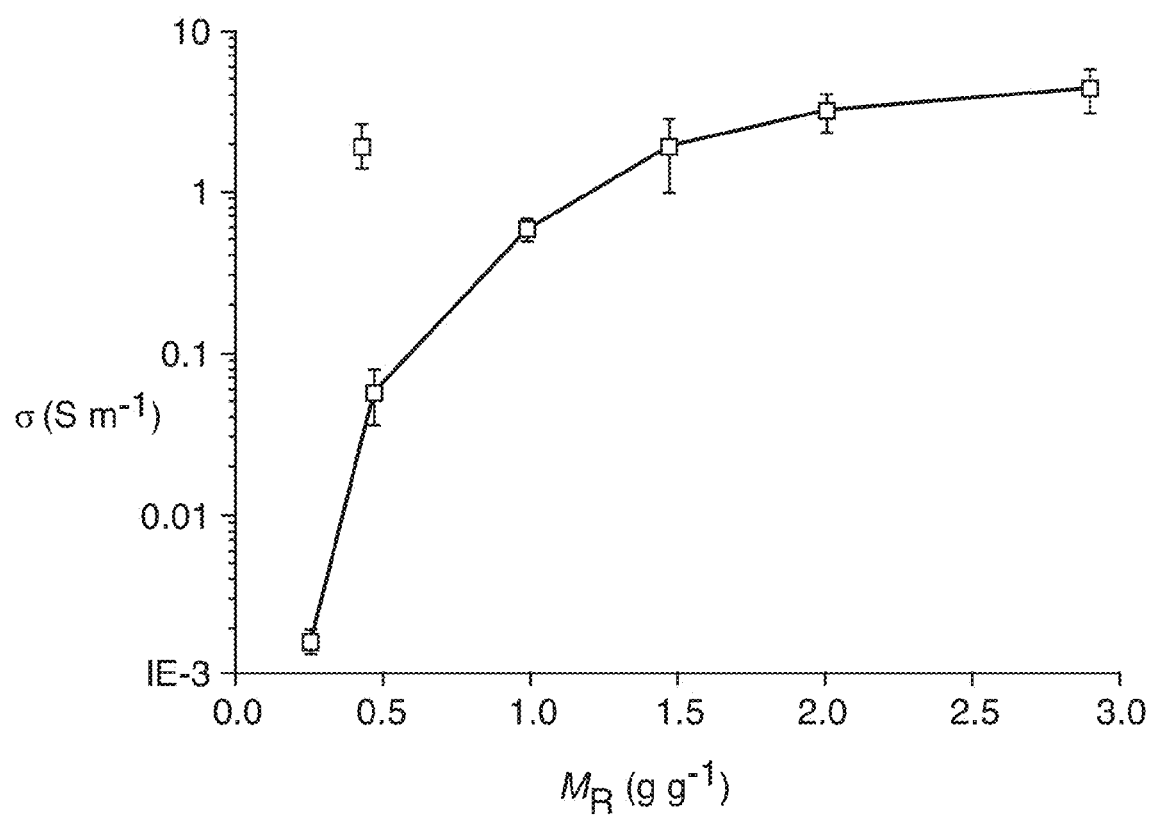
FIG. 8 illustrates coating electrical conductivity ($\sigma$) vs. coating composition $M_R$.

FIG. 7 presents a photographic image of a 10 µL water droplet placed on a superhydrophobic coating, demonstrating its liquid repellent property. FIG. 8 presents a plot of coating conductivity σ vs. $M_R$, where increasing concentrations of xGnP result in an increase in conductivity of the composite coating (measured by the two probe method). While the conductivity levels are relatively low, likely owing to non-alignment of graphite platelets as well as the porosity of the coating, such formulations can still be useful for anti-static coatings for packaging applications.

TABLE 1

Example of dispersions used for creating PE-xGnP composite coatings.

| Ingredient | Concentration (wt. %) |
|---|---|
| PE | 3.3 |
| xGnP | 0.8-10.0 |
| NH$_3$(aq) | 6.7 |
| Water | 89.2-80 |

Figure 9:
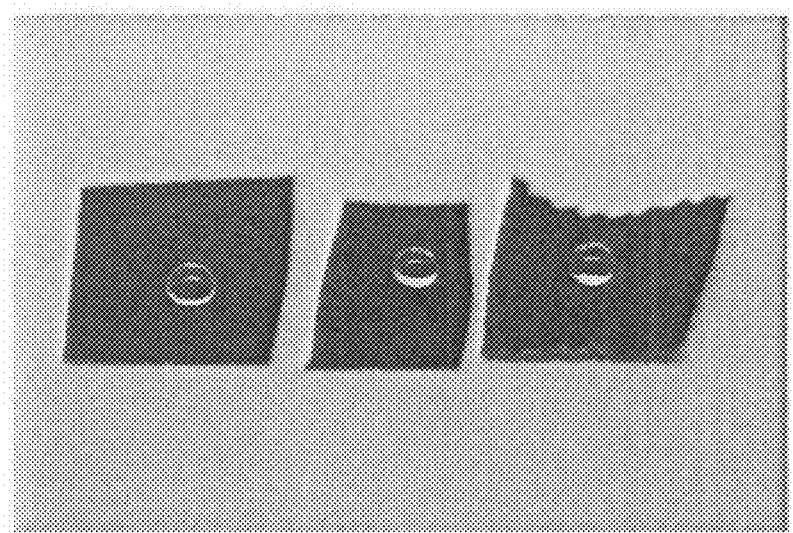
FIG. 9 illustrates water droplet behavior on substrates with a superhydrophobic PE-xGnP coating ($M_R$=1.5) with high density paper towel, hydroknit, and UCTAD tissue from left to right.
Figure 10:
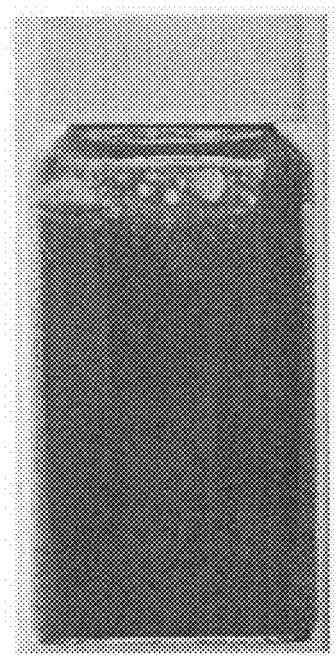
FIG. 10 illustrates a KOH-stabilized dispersion (0.7 wt./vol. %) used for generating a PE-xGnP coating by spray ($M_R$=1.0)

FIG. 9 presents an image of three non-woven substrates (professional paper towel, hydroknit, and a standard paper towel) that have a PE-xGnP superhydrophobic coating treatment. All three coated surfaces displayed repellency to water after spray coating. FIG. 10 presents an image of a PE-xGnP dispersion that was stabilized with KOH instead of $NH_3(aq)$. Because KOH is ~10,000× stronger of a base as compared with $NH_3(aq)$ (10,000× larger dissociation constant, $K_b$), and because KOH was shown to be able to stabilize the dispersion as effectively as $NH_3(aq)$, we infer that many bases of intermediate strength should be capable of stabilizing the PE-xGnP dispersion in water too.

Figure 11:
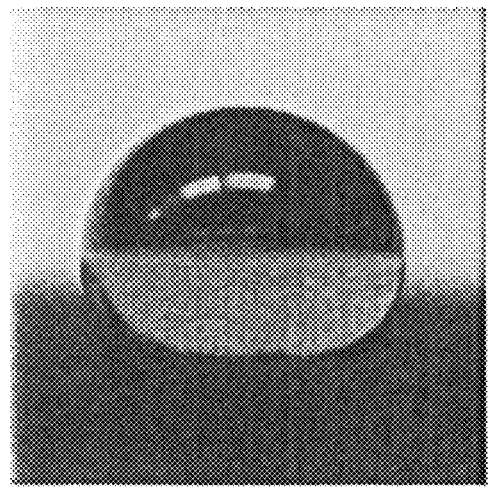
FIG. 11 illustrates a ~10 µL water droplet (dyed blue) on a PE-xGnP coating ($M_R$=1.0) formed from a dispersion stabilized by KOH.

FIG. 11 presents an image of the wetting behavior of a water droplet on a coating formed by spray deposition of a PE-xGnP dispersion stabilized by KOH. The surface is shown to be highly hydrophobic; however, upon further wettability characterization, specifically the sliding angle measurements presented in Table 2, it is apparent that the surface is not self-cleaning and is actually a sticky hydrophobic surface, reminiscent of the rose-petal effect. This lack of droplet mobility can be understood by considering the role of the base (e.g., $NH_3(aq)$, KOH) in generating the coating. In the case of $NH_3(aq)$, initially it should act to stabilize hydrophobic xGnP in water; after being deposited onto the coating, it should vaporize. Vaporization is performed readily because ammonia has a boiling point ~240 K. In the case of KOH, it also acts to stabilize the xGnP in water (see FIG. 10); however, it is non-volatile (boiling point ~1600 K) and remains in the coating after drying, promoting the undesirable hydrophobic character of the coating (i.e., sticky hydrophobicity). Therefore, when choosing an appropriate base for this application, one should ensure that it is volatile enough that it does not remain in the coating after drying.

TABLE 2

Water droplet (8 µL) sliding angle value on a superhydrophobic coating formed from spray depositing a KOH stabilized (0.2 wt./vol. %) PE-xGnP dispersion ($M_R$ = 1.5).

| substrate | sliding angle (°) | coating thickness (g m$^{-2}$) |
|---|---|---|
| glass slide | Sticky | 16.2 ± 2.3 |

Figure 12:
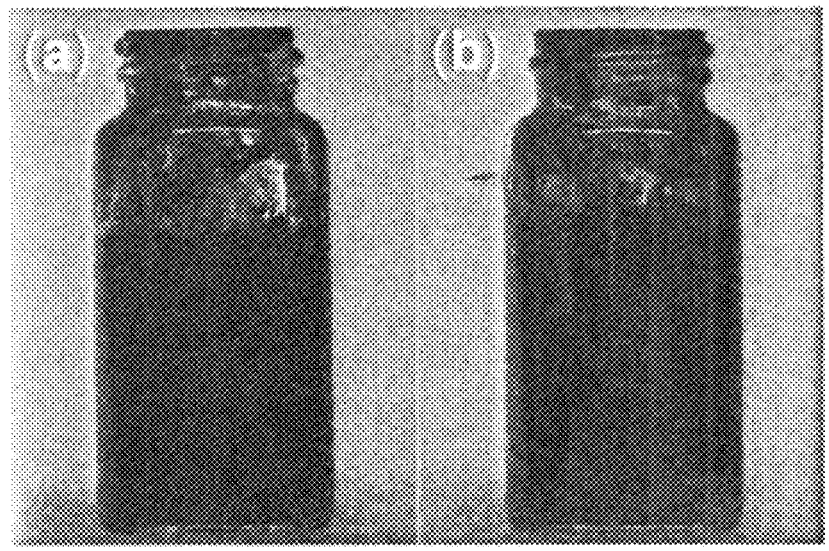
FIG. 12(a) illustrates PE-xGnP dispersion ($M_R$=1.5) before bath sonication.
FIG. 12(b) illustrates the PE-xGnP dispersion ($M_R$=1.5) of FIG. 12(a) after 15 min of bath sonication.

FIG. 12 presents an image of a PE-xGnP dispersion before and after bath sonication to elucidate the effect, if any, on swelling of the dispersion. From this simple analysis, it is not apparent whether bath sonication does promote swelling of the dispersion; however, further work would need to be done to confirm this. Table 3 presents water droplet sliding angle data for a variety of substrates that have been coated with a PE-xGnP coating. All of the substrates investigated here have low water droplet sliding angle values. In the case of hydroknit, the surface is self-cleaning (sliding angle <10°). This is important because the coating treatment is able to make both hydrophilic (professional paper towel) and hydrophobic (blue SMS) substrates superhydrophobic by a water-based coating procedure, which suggests that many other nonwoven substrates of intermediate porosity and wettability should be able to be made superhydrophobic.

TABLE 3

Water droplet (8 µL) sliding angle values on various substrates that have been treated with a superhydrophobic PE-xGnP coating ($M_R$ = 3.0).

| substrate | sliding angle (°) | coating thickness (g m$^{-2}$) |
|---|---|---|
| hydroknit (52 g m$^{-2}$) | 8 ± 3 | 12.4 |
| blue SMS | 18 ± 6 | 19.9 |
| professional paper towel | 12 ± 4 | 11.7 |

All documents cited herein are, in relevant part, incorporated herein by reference; the citation of any document is not to be construed as an admission that it is prior art with respect to the present disclosure. To the extent that any meaning or definition of a term in this document conflicts with any meaning or definition of the same term in a document incorporated by reference, the meaning or definition assigned to that term in this document shall govern.

While particular aspects of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A superhydrophobic surface comprising a substrate treated with a non-fluorinated composition comprising:
   a water-dispersible hydrophobic component free of fluorine;
   a water-dispersible filler particle; and
   water, wherein the composition is at a pH greater than 7, wherein the hydrophobic component is in an aqueous dispersion, and wherein the aqueous dispersion is free of organic solvents.

2. The superhydrophobic surface of claim 1, wherein the hydrophobic component is selected from the group consisting of polymers and nanoparticles.

3. The superhydrophobic surface of claim 1, wherein the hydrophobic component includes a polyolefin.

4. The superhydrophobic surface of claim 1, wherein the hydrophobic component includes a co-polymer of olefin and acrylic acid.

5. The superhydrophobic surface of claim 1, wherein the filler particle has a high aspect ratio.

6. The superhydrophobic surface of claim 1, wherein the filler particle includes acrylic acid, carboxylic acid, or a combination thereof as a functional group.

7. The superhydrophobic surface of claim 1, wherein the filler particle includes an exfoliated graphite.

8. The superhydrophobic surface of claim 7, wherein the exfoliated graphite is selected from graphene, a few layer graphene, and an exfoliated graphite nanoplatelet.

9. The superhydrophobic surface of claim 1, wherein the composition is free of volatile organic compounds.

10. The superhydrophobic surface of claim 1, further comprising a stabilizing compound.

11. The superhydrophobic surface of claim 10, wherein the stabilizing compound is selected from KOH and $NH_3$ (aq).

12. The superhydrophobic surface of claim 1, wherein the substrate is a nonwoven web.

13. The superhydrophobic surface of claim 1, wherein the substrate is a tissue product.

14. The superhydrophobic surface of claim 1, wherein the filler particle includes an acid functional group.

15. A superhydrophobic surface comprising a substrate treated with a non-fluorinated composition comprising:
   a water-dispersible hydrophobic polymer free of fluorine;
   a water-dispersible exfoliated graphite filler particle including acid functional groups;
   water; and
   a stabilizing compound, wherein the composition is at a pH greater than 7, wherein the hydrophobic polymer is in an aqueous dispersion, and wherein the aqueous dispersion is free of organic solvents.

16. The superhydrophobic surface of claim 15, wherein the hydrophobic polymer includes a polyolefin.

17. The superhydrophobic surface of claim 15, wherein the filler particle includes acrylic acid, carboxylic acid, or a combination thereof as a functional group.

18. The superhydrophobic surface of claim 15, wherein the exfoliated graphite is selected from graphene, a few layer graphene, and an exfoliated graphite nanoplatelet.

19. The superhydrophobic surface of claim 15, wherein the stabilizing compound is selected from KOH and $NH_3$ (aq).

20. A superhydrophobic surface comprising a substrate treated with a non-fluorinated composition comprising:
- a water-dispersible hydrophobic component free of fluorine;
- a stabilizing compound, wherein the stabilizing compound is selected from KOH and $NH_3$(aq);
- a water-dispersible filler particle; and
- water, wherein the composition is at a pH greater than 7, wherein the hydrophobic component is in an aqueous dispersion, and wherein the aqueous dispersion is free of organic solvents.

* * * * *